United States Patent
Proebstle

(10) Patent No.: US 9,347,414 B2
(45) Date of Patent: May 24, 2016

(54) VEHICLE WITH AN ELECTRIC SYSTEM ARCHITECTURE, AND METHOD FOR OPERATING SAME

(71) Applicant: Bayerische Motoren Werke Aktiengesellschaft, Munich (DE)

(72) Inventor: Hartmut Proebstle, Wuerzburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/498,122

(22) Filed: Sep. 26, 2014

(65) Prior Publication Data

US 2015/0011358 A1    Jan. 8, 2015

Related U.S. Application Data

(63) Continuation of application No. PCT/EP2013/056504, filed on Mar. 27, 2013.

(30) Foreign Application Priority Data

Mar. 28, 2012 (DE) .......................... 10 2012 204 976

(51) Int. Cl.
| | |
|---|---|
| B60W 10/08 | (2006.01) |
| F02N 11/08 | (2006.01) |
| H02J 1/00 | (2006.01) |
| B60R 16/03 | (2006.01) |

(Continued)

(52) U.S. Cl.
CPC ............ *F02N 11/0866* (2013.01); *B60R 16/03* (2013.01); *B60R 16/033* (2013.01); *B60W 10/06* (2013.01); *B60W 10/08* (2013.01); *H02J 1/00* (2013.01); *H02J 2001/008* (2013.01); *Y10S 903/907* (2013.01); *Y10T 477/23* (2015.01)

(58) Field of Classification Search
CPC ........................... Y10S 903/907; Y10S 903/96
USPC ............................................................. 477/3
See application file for complete search history.

(56) References Cited

U.S. PATENT DOCUMENTS

| 7,477,040 B2 | 1/2009 | Bolz et al. |
|---|---|---|
| 2004/0112320 A1 | 6/2004 | Bolz et al. |

(Continued)

FOREIGN PATENT DOCUMENTS

| DE | 102 56 704 B3 | 2/2004 |
|---|---|---|
| DE | 103 05 058 B3 | 3/2004 |
| DE | 102 48 658 A1 | 5/2004 |

(Continued)

OTHER PUBLICATIONS

International Search Report (PCT/ISA/210) dated Sep. 19, 2013 with English translation (five pages).
German Search Report dated Oct. 10, 2012 with partial English translation (10 pages).

*Primary Examiner* — Justin Holmes
*Assistant Examiner* — Stacey Fluhart
(74) *Attorney, Agent, or Firm* — Crowell & Moring LLP

(57) ABSTRACT

A vehicle is provided with a hybridized drive train and a low-voltage onboard power supply system. The low voltage onboard power supply system includes electric consuming devices, an energy accumulator and a starter for an internal-combustion engine. The low-voltage onboard power supply system further includes a support accumulator and a first switch between the support accumulator and the rest of the low-voltage onboard power supply system.

6 Claims, 2 Drawing Sheets

(51) Int. Cl.
*B60R 16/033* (2006.01)
*B60W 10/06* (2006.01)

(56) References Cited

U.S. PATENT DOCUMENTS

2006/0137918 A1  6/2006  Dinser et al.
2008/0011528 A1* 1/2008  Verbrugge et al. ........... 180/65.2

FOREIGN PATENT DOCUMENTS

| DE | 102 51 589 A1 | 5/2004 |
| DE | 103 05 939 A1 | 8/2004 |
| DE | 10 2007 017 187 A1 | 10/2008 |
| DE | 10 2007 026 164 A1 | 12/2008 |
| DE | 10 2007 029 025 A1 | 12/2008 |
| DE | 10 2010 040 864 A1 | 3/2012 |

* cited by examiner

VEHICLE WITH AN ELECTRIC SYSTEM ARCHITECTURE, AND METHOD FOR OPERATING SAME

CROSS REFERENCE TO RELATED APPLICATIONS

This application is a continuation of PCT International Application No. PCT/EP2013/056504, filed Mar. 27, 2013, which claims priority under 35 U.S.C. §119 from German Patent Application No. 10 2012 204 976.2, filed Mar. 28, 2012, the entire disclosures of which are herein expressly incorporated by reference.

BACKGROUND AND SUMMARY OF THE INVENTION

The invention relates to a vehicle having a hybridized drive train and having a low-voltage onboard power supply system, which comprises electric consuming devices, an energy accumulator and a starter for an internal-combustion engine.

An electric onboard power supply is a complex electrical system. In German Patent Document DE 10 2007 017 187 A1, for example, an onboard power supply system with voltage-sensitive consuming devices of a vehicle is described which has an engine start-stop function. The voltage-sensitive consuming device is supported by way of a direct-voltage control element and a stop element.

German Patent Document DE 102 48 658 A1 describes the voltage-related support of power-sensitive consuming devices and high-power consuming devices by the parallel connection of a supercapicitor or a supercap module.

It is an object of the invention to provide an improved vehicle having a hybridized drive train and a low-voltage onboard power supply system, which comprises electric consuming devices, an energy accumulator and a starter for an internal-combustion engine.

This and other objects are achieved by a vehicle having a hybridized drive train and having a low-voltage onboard power supply system, which comprises electric consuming devices, an energy accumulator and a starter for an internal-combustion engine. The low-voltage onboard power supply system further comprises a support accumulator. The low-voltage onboard power supply system has a first switch between the support accumulator and the additional low-voltage onboard power supply system.

According to the invention, the low-voltage onboard power supply system comprises a support accumulator and a first switch between the support accumulator and the additional low-voltage onboard power supply system.

The vehicle further has a bidirectional direct-voltage control element, which comprises a first interface and a second interface, the first interface being connected with the support accumulator and the second interface being connected with the low-voltage onboard power supply system.

A second switch of the low-voltage onboard power supply system has the effect that the second interface of the direct-voltage control element and the energy accumulator can be electrically separated from the additional low-voltage onboard power supply system.

The starter of the internal-combustion engine of the hybridized drive train is situated between the energy accumulator and the second interface of the direct-voltage control element.

By way of the starter, the internal-combustion engine can be additionally started (additional start) during the driving operation of the vehicle, so that traction energy can also be provided from power of the internal-combustion engine.

During the driving operation of the vehicle, the first switch and the second switch are closed; before an additional start, the second switch is opened; after the additional start, the second switch is closed; during an afterrunning of the vehicle, the support accumulator is partially discharged, and subsequently, the first switch is opened; during a stationary operation of the vehicle, the first switch is opened, and during a prerunning of the vehicle, the support accumulator is charged by way of the direct-current control element, and subsequently, the first switch is closed.

This means that, at an additional start of the internal-combustion engine in the driving operation, the consuming devices are uncoupled from the electric potential of the energy accumulator and are supported by the support accumulator.

When, in an afterrunning phase, the vehicle is changed from the driving operation to a rest condition—also called "falling asleep of the vehicle"—the support accumulator is discharged and the first switch is opened. Therefore, no direct electric connection exists between the support accumulator during the phase of the vehicle without any driving operation and the remaining low-voltage onboard power supply system. This is advantageous, for example, in the case of power-optimized support accumulators.

When, in a prerunning phase, the vehicle is changed from the rest condition to the driving operation—also called "awaking of the vehicle"—, the support accumulator is pre-charged by way of the direct-voltage control element and the first switch is closed.

At the beginning of the driving operation, the support accumulator is therefore at the potential of the low-voltage onboard power supply system and supports the consuming devices, particularly during an additional start when the second switch is open.

As an alternative, the vehicle may also have an expanded onboard power supply system with high-power consuming devices and with an additional accumulator and a bidirectional direct-voltage control element, which comprises a first interface and a second interface, the first interface being connected with the support accumulator and the second interface being connected with the expanded onboard power supply system.

It will then be particularly advantageous for the low-voltage onboard power supply system to have a second switch, and, by means of the second switch, the energy accumulator can be electrically separated from the additional low-voltage power supply system. The starter is connected in parallel with respect to the energy accumulator.

During the driving operation of the vehicle, the first switch and the second switch are closed; before an additional start, the second switch is opened; after the additional start, the second switch is closed; during an afterrunning of the vehicle, the support accumulator and the additional accumulator are partially discharged, and subsequently, the first switch is opened; during a stationary operation of the vehicle, the first switch is opened; during a prerunning of the vehicle, the support accumulator is charged by way of the direct-current control element, and subsequently, the first switch is closed and, during the prerunning, the additional accumulator is charged by way of the direct voltage control element.

This means that, at an additional start of the internal-combustion engine in the driving operation, the consuming devices are uncoupled from the electric potential of the energy accumulator and are supported by the support accumulator. The high-power consuming devices are supported by the additional accumulator.

When, in an afterrunning phase, the vehicle is changed from the driving operation to a rest condition—also called "falling asleep of the vehicle"—the support accumulator and the additional accumulator are discharged and the first switch is then opened. Therefore, no direct electric connection exists between the support accumulator during the phase of the vehicle without any driving operation and the remaining low-voltage onboard power supply. This is advantageous, for example, in the case of power-optimized support accumulators.

When, in a prerunning phase, the vehicle is changed from the rest condition to the driving operation—also called "awaking of the vehicle"—, the support accumulator is precharged by way of the direct-voltage control element and the first switch is closed. Subsequently, a precharging of the additional accumulator takes place by way of the direct-voltage control element.

At the beginning of the driving operation, the support accumulator is therefore at the potential of the low-voltage onboard power supply system and supports the consuming devices particularly during an additional start when the second switch is open. At the start of the driving operation, the additional accumulator is at a predeterminable potential in order to support the high-power consuming devices in a voltage-related manner.

The invention is based on the considerations indicated in the following.

There are vehicles which have a classical 12 V onboard power supply system for supplying electric energy. The classical 12 V architecture is incapable of meeting future demands by high-power consuming devices, such as, for example, chassis systems (electric roll stabilization, electric active steering system) or additional engine starting systems in the case of hybrid vehicles or vehicles having an engine start-stop function.

There is therefor provided an expansion of the conventional vehicle onboard power supply system with respect to its architecture by one voltage level to 48 V for high-power consuming devices and to equip the 12 V onboard power supply system with a dynamic support accumulator and two switches.

An operating strategy is provided for the two switches, which strategy permits a charging of the dynamic support accumulator with the termination of the rest condition of the vehicle. This charging is called precharging.

This contributes to the stabilization of the energy supply in the vehicle, for example, in the case of additional starts and in the case of driving maneuvers.

The total weight of the energy accumulators that are used can be minimized when, for example, a supercapacitor is used as the dynamic additional accumulator and a lead battery can be dimensioned to be smaller.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
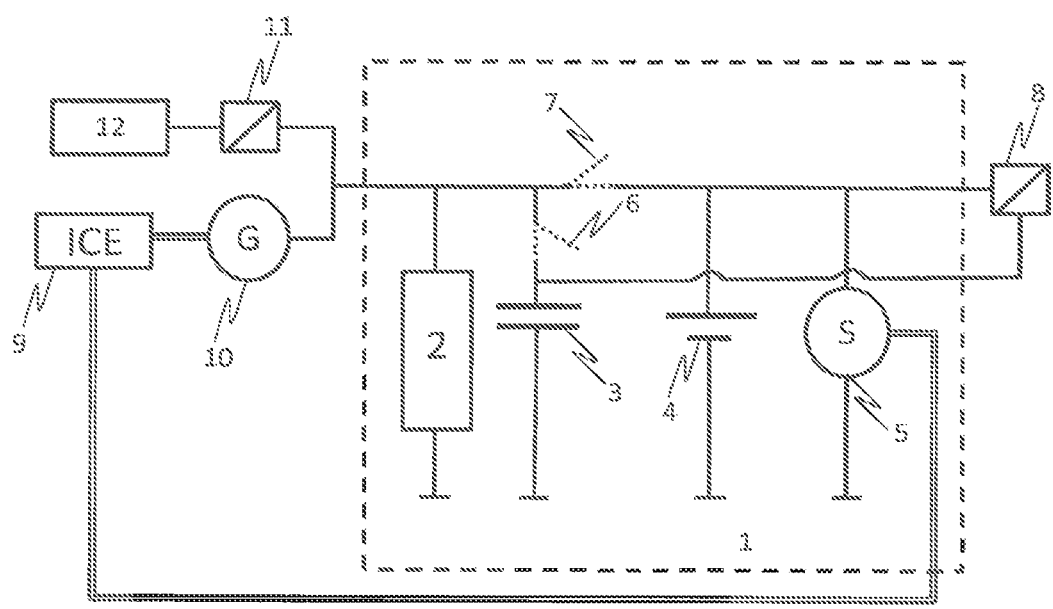
FIG. 1 is a schematic diagram of a vehicle having an onboard power supply architecture.

FIG. 1 illustrates a vehicle having a low-voltage onboard power supply system 1. A high-voltage onboard power supply system 12 is linked to this low-voltage onboard power supply system by way of a high-voltage control element 11. The high-voltage control element is constructed as a bidirectional direct-voltage control element.

The high-voltage onboard power supply system includes an electrified drive train of the vehicle, which vehicle type may be either a hybrid vehicle (HEV, hybrid electric vehicle), a plug-in hybrid vehicle (PHEV, plug-in hybrid electric vehicle) or an electric vehicle having an internal-combustion engine as a range extender. These vehicle types are known to the person skilled in the art.

The low-voltage onboard power supply system has several electric consuming devices (electrical loads) 2 and one, preferably energy-optimized electric energy accumulator 4, which may be constructed as a secondary lithium ion battery or as a lead acid battery.

Furthermore, the low-voltage onboard power supply system has a support accumulator 3, which is preferably designed as a power-optimized electric energy accumulator, for example, as a supercapacitor stack having a nominal voltage fluctuation at 12 V.

The electric energy accumulator 4 and the support accumulator 3 each have a higher electric potential which is or can be electrically connected with the potential of the low-voltage onboard power supply, and a lower electric potential which electrically is in contact with a mass of the vehicle (grounded).

In addition, the low-voltage onboard power supply system 1 has a first switch 6 which connects the higher potential of the support accumulator 3 with the potential of the low-voltage onboard power supply system and by which the support accumulator 3 can be electrically separated from the low-voltage onboard power supply system.

Figure 2:
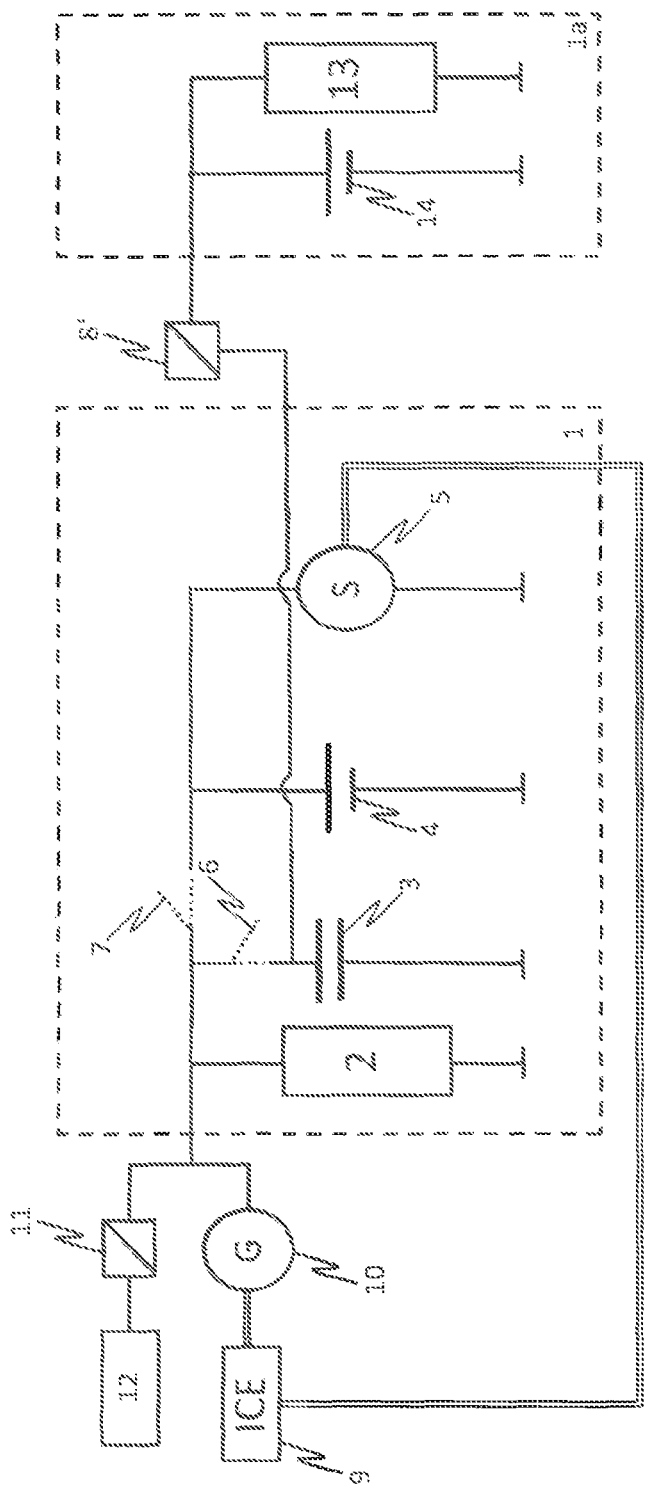
FIG. 2 is a schematic diagram of a vehicle having an onboard power supply architecture and an onboard power supply system expansion.

As an HEV or a PHEV, the vehicle, according to FIG. 1 or 2, further has a generator 10, G, by which the low-voltage onboard power supply system can be supplied with electric power by way of the electric output of the generator 10 and by which, by way of the mechanical input of the generator, mechanical power can be consumed by an internal-combustion engine 9, ICE. The internal-combustion engine 9 can be started by a starter 5, S which is electrically connected with the low-voltage onboard power supply system.

The consuming devices 2, the energy accumulator 4, the support accumulator 3 and, additionally, the generator 10 and the starter 5 are each electrically connected or can be connected with the electric potential of the low-voltage onboard power supply system, and are in each case electrically in contact with an electric mass of the vehicle.

In addition, in FIG. 1, the vehicle has a direct-voltage control element 8, which includes a first electric interface and a second electric interface. The direct-voltage control element 8 has a bidirectional construction.

The first electric interface is electrically connected directly with the higher potential of the support accumulator 3. The second electric interface is connected with the potential of the low-voltage onboard power supply system.

The low-voltage onboard power supply system 1 further has a second switch 7. By way of the second switch 7, the electric consuming devices 2 and the higher potential of the support accumulator 3 can be electrically connected with the higher potential of the energy accumulator 4. In the opened condition, the second switch 7 thereby causes an electric decoupling of the energy accumulator 4 from the low-voltage onboard power supply system. This electric decoupling from the low-voltage onboard supply system when the second switch is open also applies to the second electric interface of the direct-voltage control element 8 and for the starter.

When the second switch 7 in FIG. 1 is closed, there is an electric connection between the low voltage onboard power supply system and the energy accumulator, the starter and the second interface of the direct-voltage control element. The first interface of the direct-voltage control element 8 is electrically connected with the support accumulator 3 and, if the first switch 6 is closed, with the consuming devices 2.

Particularly advantageously, a vehicle according to FIG. 1 permits the following operating strategy of the first switch and of the second switch.

In the conventional driving operation, the first switch and the second switch are closed. If a high electric power demand of a consuming device 2 occurs during the driving operation or the internal-combustion engine has to be started additionally, the electric consuming device will be supplied with electric power by the energy accumulator and by the support accumulator.

If the internal-combustion engine has to be started by the starter during the driving operation (additional start in the case of the HEV or PHEV), the first switch will remain closed and the second switch will be opened during the additional start. After the additional start, the second switch will be closed. This has the result that, during the additional start, the consuming devices 2 can be supplied with electric power by the support accumulator and are supported by the voltage fluctuation of the higher potential of the support accumulator.

During a proper additional start of the internal-combustion engine, which lasts less than 1 second in duration, the voltage will drop at the energy accumulator 4 because the starter 5 draws electric power from the energy accumulator for starting the rotation of the internal-combustion engine. Particularly at the beginning of an additional starting operation, a short-circuit current will occur by way of an excitation winding of the starter, which results in a particularly strong voltage drop of a few milliseconds in duration, the so-called starting voltage drop, at the energy accumulator.

Because of the opened second switch, the support accumulator and the consuming devices are electrically decoupled from the starting voltage drop. Because of the time-related sensitivity of a conventional direct-voltage control element in comparison to the time scale of the starting voltage drop, the power transfer by way of the electric connection of the support accumulator and the first interface of the direct-voltage control element 8 to the starter and the energy accumulator will be negligible.

If the vehicle is parked according to FIG. 1 and changes to a rest condition, the power-optimized additional accumulator and the power-optimized support accumulator will be at least partially discharged, for example, by the afterrunning of the vehicle or by charging the energy accumulator by way of the direct-voltage control element. The first switch 6 will then be opened; the second switch remains closed.

An at least partial discharging of the supercapacitors has a positive effect on their service life. In contrast, the energy accumulator 4, for example, constructed as a lead acid battery, during a stationary time of the vehicle, should have a charging state that is as high as possible in order to also extend its service life. This supports the operating strategy of the first switch and of the second switch.

If the vehicle according to FIG. 1 is changed from the rest condition to the driving operation, during the prerunning or awaking of the vehicle, the support accumulator 3 is precharged by way of the direct-voltage control element from the energy accumulator 4. The first switch 6 will then be closed. The support accumulator 3 is therefore operable and charged in order to support the low-voltage onboard power supply system in the case of the opened second switch. The precharging can also take place from the high-voltage onboard power supply system 12 by way of the control element 11.

A further embodiment is illustrated in FIG. 2 based on FIG. 1.

A vehicle according to FIG. 2 has high-power consuming devices 13. Examples are an electric roll stabilization or an electric active steering system. High-power consuming devices 13 are characterized in that a supply of these consuming devices by the low-voltage onboard power supply system 1 can be guaranteed sufficiently reliably only in the case of a high current flow in a low-voltage onboard power supply system. However, this would result in an undesirable voltage drop in the low-voltage onboard power supply system. For this reason, the high power consuming devices 13 with high-power consumption by way of an expanded onboard power supply system (onboard power supply expansion, 1a) are electrically supplied at a nominal voltage fluctuation which is higher in comparison to the low-voltage onboard power supply system.

For providing a higher voltage fluctuation of the onboard power supply expansion 1a in comparison to the low-voltage onboard power supply system 1, in FIG. 2, a direct-voltage control element 8' is used instead of the direct-voltage control element 8. This direct-voltage control element 8' has a bidirectional design. A first interface is electrically connected directly with the higher potential of the support accumulator 3. A second interface of the control element 8' is electrically connected with the onboard power supply system expansion 1a and is therefore disposed on the electric potential of the expanded onboard power supply system.

In addition to the high-power consuming devices 13 in the expanded onboard power supply system 1a, an additional accumulator 14 is connected in parallel and is power-optimized. This may, for example, be a supercapacitor stack or a lithium ion battery with a nominal voltage fluctuation at approximately 48 V.

Particularly advantageously, this allows a vehicle according to FIG. 2 to have the following operating strategy of the first switch and of the second switch.

During the conventional driving operation, the first switch and the second switched are closed. If, during the driving operation, a high electric demand of a high-power consuming device 13 occurs in the expanded onboard power supply system 1a (for example, a sudden steering maneuver by means of the electric active steering system), the voltage in the expanded onboard power supply system 1a is supported by the additional accumulator 14. In addition, by way of the control element 8', a transfer of electric power takes place from the low-voltage onboard power supply system. In the further driving operation, a charging of the additional accumulator 14 takes place by way of the control element 8' from the low-voltage onboard power supply system.

If, in the conventional driving operation, the internal-combustion engine 9 has to be started additionally (additional start in the case of the HEV, the PHEV or the range extender in the case of an electric vehicle), the second switch 7 is opened; the first switch 6 remains closed. Electric consuming devices 2 are supplied with electric energy from the energy accumulator and are supported in their voltage fluctuation by the support accumulator.

The second switch is closed after the additional start. This has the result that the consuming devices 2 can be supplied with electric power by the support accumulator 3 during the additional start and are supported by the voltage fluctuation of the higher potential of the support accumulator.

During an intended additional start of the internal-combustion engine, which lasts less than 1 second in duration, the voltage will drop at the energy accumulator 4, because, for starting the rotation of the internal-combustion engine, the starter draws electric energy from the energy accumulator 4. In particular, at the beginning of an additional starting operation, a short-circuit current will occur by way of an excitation winding of the starter, which results in a particularly strong voltage drop of a few milliseconds in duration, —the so-called starting voltage drop—, at the energy accumulator.

As a result of the opened second switch, the support accumulator and the consuming devices are electrically decoupled from the starting voltage drop. Because of the time-related sensitivity of a conventional direct-voltage control element in comparison to the duration of the starting voltage drop, the power transfer by way of the electric connection of the support accumulator and the first interface of the direct-voltage control element 8' to the starter and the energy accumulator will be negligible.

If the vehicle is parked according to FIG. 2 and changes to a rest condition, the power-optimized additional accumulator and the power-optimized support accumulator are at least partially discharged, for example, by the afterrunning of the vehicle while consuming energy of the consuming devices 2 and/or of the high-power consuming devices 13 or by charging the energy accumulator 4. The additional accumulator 14 is discharged, for example, from 48 V to 36 V; the support accumulator 3 is discharged from 12 V to 8 V. The first switch 6 will then be opened; the second switch remains closed.

An at least partial discharging of supercapacitors has a positive effect on their service life. In contrast, the energy accumulator 4, for example, constructed as a lead acid battery, during a stationary time of the vehicle, should have a charging state that is as high as possible in order to also extend its service life. This supports the operating strategy of the first switch and of the second switch.

If the vehicle according to FIG. 2 is changed from the rest condition to the driving operation, during the prerunning or awaking of the vehicle, the support accumulator 3 is precharged by way of the direct-voltage control element (8') from the additional accumulator 14. Because of the higher nominal voltage fluctuation, this is conceivable even from a partially discharged state of the additional accumulator at, for example, 36 V. Subsequently, the first switch is closed. The support accumulator 3 is therefore operable and charged in order to support the low-voltage onboard power supply system in the case of the opened second switch. The precharging can also take place from the high-voltage onboard power supply system 12 by way of the control element 11.

After the precharging of the support accumulator 3, the first switch and the second switch are closed, i.e. while the electric potential between the support accumulator and the energy accumulator is comparable. The closing of the first switch results in a slight potential equalization between the support accumulator and the energy accumulator for setting a common equal electric potential. A closing of the first switch without a precharging of the power-optimized support accumulator 3 by way of the control element 8' would indicate extremely high currents between the first switch and the second switch. After the precharging, during the prerunning of the vehicle, the additional accumulator 14 is charged from the low-voltage onboard power supply system by way of the direct-voltage control element 8'. Since the energy accumulator 4 is energy-optimized and the additional accumulator 14 is power-optimized, the charging of the additional accumulator 14 indicates no significant voltage reduction in the low-voltage onboard power supply system.

This operating strategy has the advantage that, during the prerunning of the vehicle, both power-optimized accumulators 3 and 14 are precharged and, in the charged condition, change to the driving operation of the vehicle.

In the driving operation, the low-voltage onboard power supply system is therefore supported by way of the support accumulator and the expanded onboard power supply system is supported by way of the additional accumulator. In the case of an additional start, the opening of the second switch signifies a limitation of the starting voltage drop to the energy accumulator.

A stable voltage supply is therefore ensured for all consuming devices of FIGS. 1 and 2 in all operating situations.

Furthermore, the precharging takes place by way of the control element 8' and without any current flow by way of switches. The precharging can therefore be carried out and monitored in a controlled manner or in a manner that saves the switches.

The use of the power-optimized accumulator(s) in FIG. 1/FIG. 2 further permits a reduction of the size of the energy-optimized energy accumulator 4 in comparison to a conventional onboard power supply system of a vehicle having only one energy accumulator 4. Since this energy accumulator is implemented, for example, as a lead battery with a typically high weight, this can signify a weight reduction of the vehicle despite the integration of a power-optimized energy accumulator(s). The power-related density, for example, of supercapacitors is comparatively so high that the weight of the supercapacitor(s) is overcompensated by the weight reduction because of the low energy-related density of the lead battery. It is therefore particularly advantageous for the energy accumulator to be designed to be energy-optimized and for the support accumulator and the additional accumulator each to be designed to be power-optimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a hybridized drive train, the vehicle comprising:
   a low-voltage onboard power supply system comprising:
      an energy accumulator;
      a support accumulator;
      a first switch operatively coupling the support accumulator with the rest of the low-voltage onboard power supply system;
   a bidirectional direct-voltage control element operatively coupled to the support accumulator and the low-voltage onboard power supply system; and
   a second switch operatively coupling the energy accumulator and the bidirectional direct-voltage control element with the rest of the low-voltage onboard power supply system;
   wherein the first switch and the second switch are configured to close for a driving operation of the vehicle;
   wherein the second switch is configured to open before an additional start of the vehicle and to close after the additional start of the vehicle;
   wherein the support accumulator is configured to partially discharge during an afterrunning of the vehicle, and the first switch is configured to subsequently open;
   wherein the first switch is further configured to open during a rest condition of the vehicle;

wherein the bidirectional direct-current control element is configured to charge the support accumulator during a prerunning of the vehicle, and the first switch is configured to subsequently close.

2. The vehicle according to claim 1, wherein the low-voltage onboard power supply system further comprises a starter for the internal combustion engine arranged between the energy accumulator and the bidirectional direct-voltage control element.

3. A vehicle having a hybridized drive train, the vehicle comprising:
   a low-voltage onboard power supply system comprising:
      an energy accumulator;
      a support accumulator; and
      a first switch operatively coupling the support accumulator with the rest of the low-voltage onboard power supply system; and
   an expanded onboard power supply system comprising an additional accumulator;
   a bidirectional direct-voltage control element operatively coupled to the support accumulator and the expanded onboard power supply system;
   a second switch operatively coupling the energy accumulator with the rest of the low-voltage onboard power supply system;
   wherein the first switch and the second switch are configured to close for a driving operation of the vehicle;
   wherein the second switch is configured to open before an additional start of the vehicle and to close after the additional start of the vehicle;
   wherein the support accumulator and the additional accumulator are is configured to partially discharge during an afterrunning of the vehicle, and the first switch is configured to subsequently open;
   wherein the first switch is configured to open during a rest condition of the vehicle;
   wherein the bidirectional direct-current control element is configured to charge the support accumulator and the additional accumulator during the prerunning of the vehicle, and the first switch is configured to subsequently close.

4. The vehicle according to claim 3, wherein the low-voltage onboard power supply system further comprises a starter for the internal combustion engine that is coupled in parallel with the energy accumulator.

5. A method of operating a vehicle equipped with a low-voltage onboard power supply system, the low-voltage onboard power supply system comprising: one or more electric consuming devices; an energy accumulator; a starter for an internal-combustion engine of the vehicle; a support accumulator; a first switch operatively configured between the support accumulator and the rest of the low-voltage onboard power supply system; a bidirectional direct-voltage control element operatively coupled to the support accumulator and the low-voltage onboard power supply system; and a second switch, wherein the bidirectional direct-voltage control element and the energy accumulator are electrically separable via the second switch from the rest of the low-voltage onboard power supply system, and wherein the starter is arranged between the energy accumulator and the second interface of the bidirectional direct-voltage control element, the method comprising:
   closing the first switch and the second switch for a driving operation of the vehicle;
   before an additional start of the vehicle, opening the second switch;
   after the additional start of the vehicle, closing the second switch;
   during an afterrunning of the vehicle, partially discharging the support accumulator and subsequently opening the first switch;
   during a rest condition of the vehicle, opening the first switch; and
   during a prerunning of the vehicle, charging the support accumulator by way of the bidirectional direct-current control element and subsequently closing the first switch.

6. A method of operating a vehicle including a low-voltage onboard power supply system, the low-voltage onboard power supply system comprising: one or more electric consuming devices; an energy accumulator; a starter for an internal-combustion engine of the vehicle; a support accumulator; and a first switch operatively configured between the support accumulator and the rest of the low-voltage onboard power supply system; an expanded onboard power supply system comprising one or more high-power consuming devices and an additional accumulator; and a bidirectional direct-voltage control element operatively coupled to the support accumulator and the expanded onboard power supply system, wherein the low-voltage onboard power supply system comprises a second switch, wherein the energy accumulator is electrically separable from the rest of the low-voltage onboard power supply system via the second switch, and wherein the starter is coupled in parallel with the energy accumulator, the method comprising:
   closing the first switch and the second switch for a driving operation of the vehicle;
   before an additional start of the vehicle, opening the second switch;
   after the additional start of the vehicle, closing the second switch;
   during an afterrunning of the vehicle, partially discharging the support accumulator and the additional accumulator and subsequently opening the first switch;
   during a rest condition of the vehicle, opening the first switch;
   during a prerunning of the vehicle, charging the support accumulator by way of the bidirectional direct-current control element and subsequently closing the first switch; and
   during the prerunning of the vehicle, charging the additional accumulator by way of the bidirectional direct-voltage control element.

\* \* \* \* \*